United States Patent [19]

Lenz

[11] Patent Number: 4,499,660

[45] Date of Patent: Feb. 19, 1985

[54] METHOD OF MAKING A LAMINATED ROTOR FOR A DYNAMOELECTRIC MACHINE

[75] Inventor: Henry G. Lenz, Scotia, N.Y.

[73] Assignee: General Electric Company, Fort Wayne, Ind.

[21] Appl. No.: 280,574

[22] Filed: Jul. 6, 1981

Related U.S. Application Data

[62] Division of Ser. No. 95,024, Nov. 16, 1979, Pat. No. 4,286,182.

[51] Int. Cl.³ .............................................. H02K 15/02
[52] U.S. Cl. .................................... 29/598; 164/109; 310/61; 310/65; 310/211; 310/217
[58] Field of Search ......... 29/598; 164/109, DIG. 10; 310/211, 212, 217, 60 R, 60 A, 61–65

[56] References Cited

U.S. PATENT DOCUMENTS 3,684,906 8/1972 Lenz ...................................... 310/61
4,301,386 11/1981 Schweder et al. ................ 310/61 X Primary Examiner—Carl E. Hall

[57] ABSTRACT

In the method of the invention a laminated rotor is made using four different types of laminae, to form a stack of laminae into which molten conductor metal is poured to form cast conductors through aligned conductor slots in each of the laminae while transition laminae function to prevent the flow of metal into the coolant ducts of the stacked assembly. Practice of the method of the invention provides for making a plurality of laminated rotor assemblies, all of which utilize standard duct laminae configurations, but some of which have different configurations of conductor slots in either or both the main rotor laminae and the vent laminae used therein. In the method of the invention standardized sets of duct laminae are used in making a plurality of different rotor assemblies, which have, respectively, different sizes and shapes of conductor slots through the main rotor and/or vent laminae thereof.

4 Claims, 7 Drawing Figures

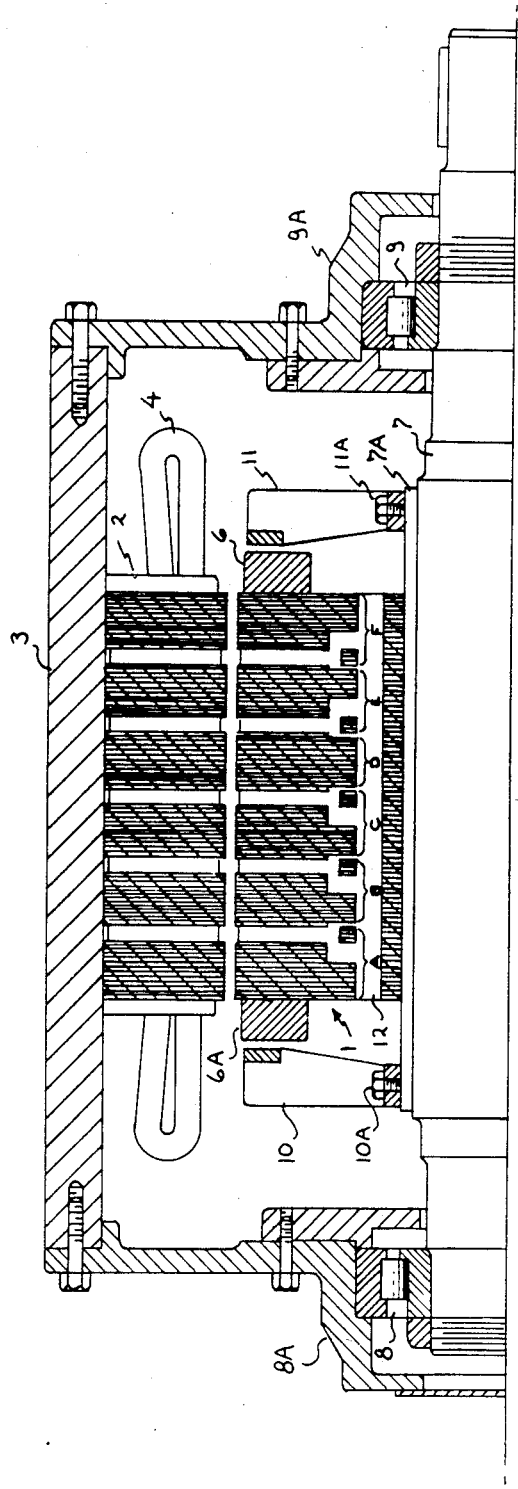
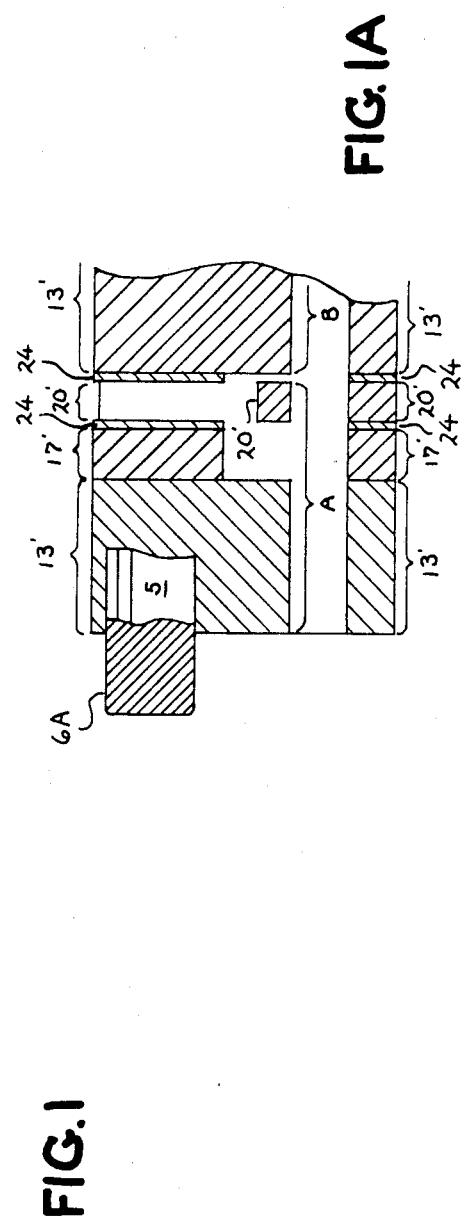
FIG. 1
FIG. 1A ture. The present invention, disclosed herein, is a further improvement over the type of laminated rotor assembly disclosed in that co-pending application, and the present invention includes a novel method for manufacturing such an improved rotor assembly.

Some advantages of the subject invention in addition to the economies of manufacture its use affords, are that the widths of radial cooling ducts can be increased relative to the sizes that might be usable with other methods of manufacture, such as the employment of casting pins to define cooling ducts in a rotor. Such larger ducts reduce the resistance to flow of cooling air, so will improve motor cooling relative to the performance of a rotor having its radial cooling duct widths limited more severely by the width of conductor slots in associated main rotor laminations. Also, with this invention, the conductor slots in the transition and duct lamination (described below) may be made with greater cross-sectional areas than the conductor slot areas in associated vent and main laminations (also described below). This possible variation allows greater design flexibility for the conductor slots in the main and vent laminae while maintaining a standardized conductor slot in the transition and duct laminae.

OBJECTS OF THE INVENTION

A primary object of the invention is to provide a laminated rotor assembly and a method of manufacturing such an assembly, so that the shortcomings and disadvantages of the prior art, as referred to and described above, are overcome.

Another object of the invention is to provide a laminated rotor assembly for a dynamoelectric machine having axial coolant passageways, radial coolant ducts and axially-extending cast conductors having different configurations at different locations along the conductors, thereby to improve the performance characteristics of the machine.

Still another object of the invention is to provide a method for manufacturing a plurality of separate laminated rotor assemblies, which have, respectively, different configurations of cast conductors through the respective main rotor laminations of the rotor, without requiring the use of differnt configurations of duct laminations for the respective rotor assemblies.

A further object of the invention is to provide a method for manufacturing a laminated rotor with cast conductor bars that has different configurations in given areas of the bars, depending upon the selection of different configurations of punched laminations for such sections, while at the same time enabling the use of standardized laminations for other portions of the rotor assembly.

A still further object of the invention is to provide a method for manufacturing a plurality of separate, laminated rotor assemblies each of which utilize standard duct laminations while various combinations of differently configured main rotor laminations and vent laminations are employed for the rotors in the respective assemblies.

Additional objects and advantages of the invention will be apparent to those skilled in the art from the description of it presented herein, considered in conjunction with the accompanying drawings.

SUMMARY OF THE INVENTION

In one preferred embodiment of the invention a dynamoelectric machine laminated rotor having axial cool-

---

METHOD OF MAKING A LAMINATED ROTOR FOR A DYNAMOELECTRIC MACHINE

This is a division of application Ser. No. 95,024, filed Nov. 16, 1979, issued as U.S. Pat. No. 4,286,182 on Aug. 25, 1981.

FIELD OF THE INVENTION

The invention relates to laminated rotor structures for dynamoelectric machines and to methods for manufacturing such structures; particularly, the invention is related to dynamoelectric machine rotor assemblies of stacked laminations in which axial coolant passageways and radial coolant ducts are provided in combination with axially extending cast conductor bars that are effective to secure the laminations in their assembled position, and to a method for making such a cast-conductor rotor assembly.

BACKGROUND OF THE INVENTION

It has been fairly common practice for a number of years prior to the invention to manufacture dynamoelectric machine rotors by casting axially-extending conductors in rotor slots defined by aligned apertures punched in stacked laminations of such an assembly. It is also generally well known to provide axial coolant passageways and associated radial coolant ducts through such rotor assemblies in order to circulate cooling air along the central portion of the rotor assembly and then through the radial ducts, past the conductor bars. A variety of manufacturing methods have been developed to construct different types of laminated rotor assemblies utilizing cast conductor bars. A number of such prior art methods and resulant rotor assemblies are described in co-pending U.S. patent application Ser. No. 824,104 (issued Nov. 17, 1981, as U.S. Pat. No. 4,301,386) which was filed on Aug. 12, 1977 by the subject Applicant and another employee of the assignee corporation, to which both that application and the present application are assigned. As is explained in that co-pending application, such prior art methods for constructing rotor assemblies frequently present common drawbacks and disadvantages, even though they have been employed successfully for a number of years. Perhaps the most universal and troublesome drawback of such prior art manufacturing methods is that they typically are relatively expensive and cumbersome to utilize because they require the employment of substantial amounts of manual labor to obtain the desired forms of cast conductors and rotor assemblies produced thereby. Due to the multiplicity of operating components, such as metal or ceramic casting pins that are necessarily employed in such prior art manufacturing processes to block casting metal from the ventilating ducts and passageways therethrough occasionally one or more of such components will be slightly misplaced from its desired operating position, thus allowing molten metal to contaminate the coolant duct or passageway areas of the assembly. That contamination necessitates either additional manufacturing axpenditures to remove such metal, or in some cases requires complete scrapping of the assembly. The invention disclosed in the above-identified co-pending patent application, comprises an improved laminated rotor assembly which is described in detail there. That assembly overcomes many of the shortcomings and disadvantages of earlier prior art rotor assemblies and associated methods of manufacant passageways, radial coolant ducts and axially-extending conductors is characterized by including a plurality of so-called transition laminae each of which are positioned, respectively, on opposite ends of a plurality of groups of duct laminae each of which groups define radial coolant ducts extending from the axial coolant passageways through the main rotor laminations of the assembly to the outer peripheral surface of the rotor. The transition laminae are each provided with conductor-receiving slots of a preselected configuration that is effective to prevent molten metal from entering the coolant ducts of the rotor assembly when molten metal is poured into conductor-receiving slots defined by apertures punched in all of the laminations of the assembly. The conductor-receiving slots in the main rotor laminations or in the groups of vent-defining laminations of the rotor assembly are either or both of different predetermined configurations than the selected configuration of the conductor slots in the transition laminae. The predetermined different configurations of the conductor slots in the main rotor laminations or the vent laminations may be such that those conductor slots overlap the radial coolant ducts defined by the group of duct laminae. However, due to the positioning of the transition laminae against both sides of the respective groups of duct laminae, molten conductor metal is blocked from entering the radial ducts even in those cases when the conductor slots through the main rotor laminations of the vent laminations are made to overlap the radial coolant ducts.

In a preferred embodiment of the method steps of the invention a laminated rotor is manufactured by stacking sets of rotor laminae on one another to define a rotor assembly in which each set includes a group of main rotor laminae stacked next to a group of vent laminae and a transition lamina is positioned between a group of stacked duct laminae and the group of vent laminae. Moreover, a plurality of the so-called transition laminae are positioned, respectively, in the rotor assembly between each such set of stacked laminations. The transition laminae are each provided with selected conductor slot configurations that are effective to prevent molten metal from flowing into the radial coolant ducts of the rotor assembly when the metal is cast into the conductor slots defined by aligned conductor-receiving slots in each of the laminae in all of the sets of laminations in the rotor assembly.

DESCRIPTION OF THE DRAWING

FIG. 1 is a side elevation view, partly in cross-section, of a dynamoelectric machine including a laminated rotor having axial coolant passageways, radial coolant ducts and axially-extending cast conductors, in combination with a plurality of transition laminae arranged in the stack of rotor laminations, according to the invention, to block communication between the radial ducts and the conductor-defining slots through the rotor.

FIG. 1A is a fragmentary, enlarged, side elevation in cross-section, of a portion of the laminated rotor illustrated in FIG. 1.

DETAILED DESCRIPTION OF THE INVENTION

Figure 2:
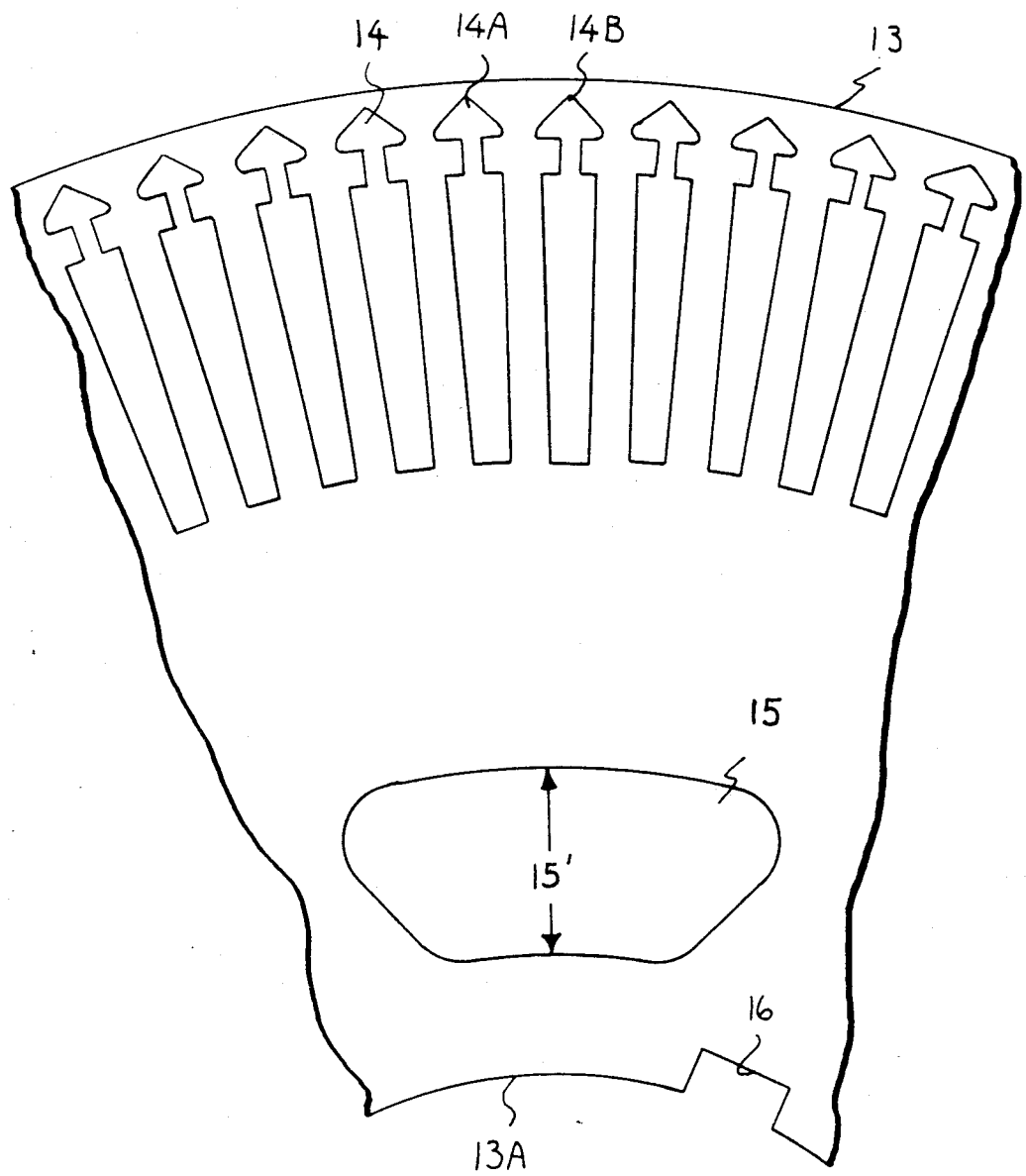
FIG. 2 is an enlarged, fragmentary, top plan view of one form of a main rotor lamination for a laminated rotor such as that shown in FIG. 1.

Referring first to FIG. 1 of the drawings it will be seen that there is shown an assembled laminated rotor 1 that is constructed according to the teaching of the present invention. To facilitate the description of the invention, the rotor 1 is shown mounted in an otherwise generally conventional dynamoelectric machine that includes a stator 2 which is rigidly mounted within a housing 3 by being shrunk fit or otherwise secured to the housing through the practice of well known motor manufacturing techniques. A suitable conventional stator winding 4 is distributed in arcuately spaced stator winding slots (not shown) and is provided with connection means for introducing energizing power to the stator winding in a conventional manner. The laminated rotor 1 is provided with a plurality of axially-extending, arcuately spaced, conductor bars, one of which is illustrated in FIG. 1A as the conductor 5. As will be described more fully below, each of the rotor conductor bars (5, etc.) are cast in preformed conductor-receiving slots through the stacked laminations of rotor 1. At the same time the rotor conductors are cast, a pair of integral end rings 6 and 6A are cast with them to form a so-called squirrel cage winding on the rotor 1, which reacts electrically with flux produced by the stator winding 4 in a well known manner.

In order to mount the rotor 1 for rotation relative to the stator 2, a machined steel shaft 7 is keyed, by a steel key 7A, to each lamina of the rotor 1, or is otherwise suitably fixed in position relative to the assembled rotor laminations by a process, such as press fitting the stacked rotor laminations onto the shaft. Rotation of the shaft 7 relative to the housing 3 is accomplished by mounting the shaft in a pair of rolling bearing assemblies 8 and 9, or in suitable conventional sliding bearing assemblies (not shown), each of which are in turn mounted in a suitable conventional manner in hubs 8A and 9A on the end shield structures of the housing 3.

To provide a desired axial flow of cooling air to the stator end windings 4, a pair of fans 10 and 11 are mounted in fixed positions on the shaft 7, by mounting bolts 10A and 11A, respectively positioned in threaded apertures in the hubs of the fans 10 and 11 as shown in FIG. 1. Alternatively, fan blades may be integrally cast with rotor end rings 6 and 6A. As the description of the invention proceeds it will be apparent that conventional means for producing air flow through the rotor 1 may be provided in a rotor assembly constructed according to the invention.

It should be understood that, as described thus far, the dynamoelectric machine illustrated in FIG. 1 is relatively conventional except for the novel rotor assembly 1, which will be explained in greater detail below. Thus, it will be appreciated that alternative relatively standardized components and well known manufacturing techniques may be used in constructing and assembling such component parts, to provide a variety of suitable dynamoelectric machines with which a laminated rotor constructed according to the invention may be assembled to afford the above-stated objects of the invention.

To further explain the novel features of the preferred embodiment of the laminated rotor 1 illustrated in FIG. 1, reference will now be made to FIGS. 2, 3, 4 and 5 to describe characteristic features of certain different groups of the laminae used to construct a preferred embodiment of the rotor 1. According to the invention, the rotor 1 includes four types of laminae, each type having a different configuration. Such types of laminae are identified herein, respectively, as main rotor laminae (shown in FIG. 2), vent laminae (shown in FIG. 3), transition laminae (shown in FIG. 4) and duct laminae (shown in FIG. 5). It will be apparent from the description of the invention that follows that various different configurations may be used to form the respective laminae in each of these four different types or groups.

In the preferred embodiment of the invention herein disclosed each of the main rotor laminae 13, as shown in FIG. 2, has a plurality of substantially equally, arcuately spaced conductor slots (14, 14A, 14B, etc.) and a plurality of arcuately spaced coolant passageways 15, et cetera. Eight of the coolant passageways are positioned radially inward from the conductor slots in this preferred embodiment. Although only a fragment of a main rotor lamination 13 is shown in FIG. 2, it will be understood that each of the rotor laminae (13, etc.) is annular in form and has a central bore defined by its inner circumferential surface 13A, so that the main rotor laminae may be fitted on a generally cylindrical shaft, such as the shaft 7 shown in FIG. 1. Also, each of the main rotor laminations 13 is provided with a punched keyway 16 to cooperate with a key, such as the key 7A shown in FIG. 1, to secure them in operating position on the shaft 7. It should be understood that each of the conductor slots 14, 14A, etc. may be of any predetermined configuration that is desired for a given rotor assembly, however, typically all of the rotor slots in the main rotor laminations will be substantially identical in configuration to one another. Moreover, as was mentioned briefly above, it is often desirable to employ a variety of rotor slot configurations for different sets of main rotor laminae used in different dynamoelectric machine rotors. Thus, second, third, etc. predetermined configurations of the rotor slots may be used in practicing the invention, as will be described more fully below, to manufacture a number of laminated rotors each of which have different operating characteristics.

Figure 3:
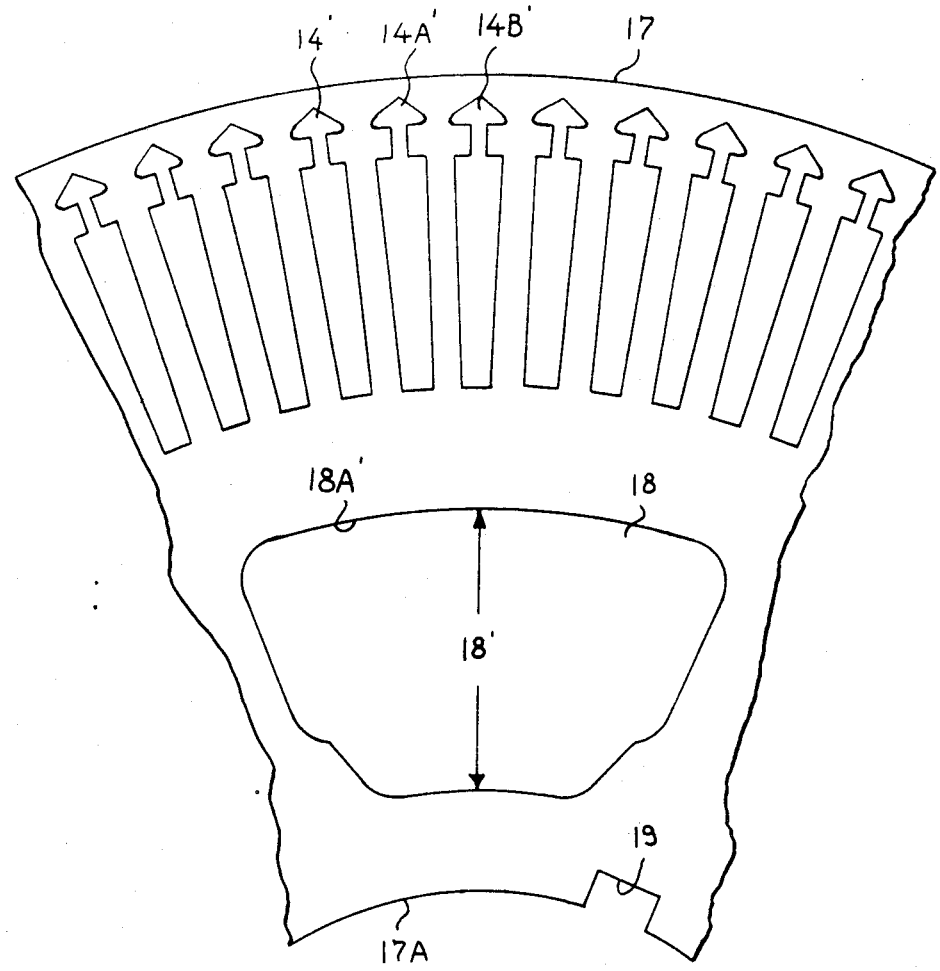
FIG. 3 is an enlarged, fragmentary top plan view of a vent lamina for a laminated rotor assembly such as that in FIG. 1.

Before further explaining that advantageous feature of the invention, reference is now made to FIG. 3 of the drawing to describe the details of a preferred embodiment of one of the vent laminae 17 shown therein in FIG. 1. Each vent lamina is substantially identical to one another, and like the main rotor laminae, is substantially annular in outline and is punched from suitable grain oriented silicon steel or other suitable magnetic steel. Each vent lamina 17 has arcuately spaced conductor slots 14', 14A', 14B', etc. around its outer circumferential portion, as shown in FIG. 3. In addition each of the laminae 17 has a plurality of vent apertures 18, etc. arcuately spaced at substantially equal intervals at locations radially inward from the conductor slots. Each of the eight vent apertures 18 in this embodiment is substantially greater in radial length, as shown by the arrows 18' in FIG. 3, than the radial length indicated by the arrow 15' in FIG. 2, in the eight associated coolant passageways 15 punched through the main rotor laminae 13. A cylindrical inner surface 17A of the vent laminae 17, including a keyway 19 punched in each vent laminae 17, serves the purposes described above for mounting the laminae on a shaft with an associated positioning key.

As illustrated in FIGS. 2 and 3, in the preferred embodiment of the invention the conductor slots 14, 14A, etc. in the main rotor laminae 13 and the conductor slots 14', 14A', etc. in the vent laminae 17 are made substantially identical in their predetermined configuration to one another. However, it should be understood at this point that in alternative embodiments of the invention the configurations or the cross-sectional areas of the conductor slots formed in the main rotor laminae 13 may be made different from those in the conductor slots through the vent laminae 17. Also, in some forms of the invention, the conductor slots in all of the groups of laminae may be essentially alike in shape. Such possible variations in the predetermined configurations for the respective conductor slots in these various laminae will be more fully discussed below in explaining the operation and advantages of the subject invention.

Before describing the details of the transition laminae of the invention shown in FIG. 4, reference will be made to FIG. 5 of the drawing to explain the detailed features of one of the duct laminae 20 used in the preferred embodiment of the laminated rotor shown in FIG. 1. Each of the duct laminae 20 are substantially annular in form and are provided with a cylindrically inner surface 20A and associated punched keyway 23 for mounting the laminae on a shaft with an associated locking key, as explained above with reference to the other laminae shown in FIGS. 2 and 3. Each of the plurality of duct laminae 20 has a plurality of arcuately spaced conductor slots 24", 24A", 14B", etc. located at substantially equally, arcuately spaced points near the outer peripheral surface. In addition, a plurality of coolant passageways such as the coolant passageway 21 are positioned at arcuately spaced points spaced inwardly from the conductor slots and from a plurality of coolant duct slots 22, 22A, 22B, etc. that are formed between respective pairs of conductor slots 24"-24A", et cetera. Each of the coolant passageways 21 has a radial dimension substantially equal to the radial dimension shown by the arrow 15 in FIG. 2 for the coolant passageways 15 through the main rotor laminae 13. As shown in this preferred embodiment of the duct laminae 20, each of the conductor slots 24", 24A", etc. are substantially identical in configuration to one another and are generally appreciably narrower at their respective widest parts than the width of the conductor slots used in the main rotor laminae 13 and the vent laminae 17, shown respectively in FIGS. 2 and 3 for the preferred embodiment of the invention being described. Thus, it should be apparent that if either the main rotor laminae 13 or the vent laminae 17 is stacked immediately next to a group of the duct laminae 20, the conductor slots in the main rotor laminae or in the vent laminae, would substantially overlap the coolant ducts 22, 22A, etc. in the duct laminae 20. Such an overlapping relationship would permit molten metal to flow from the conductor slots into the coolant ducts when metal is poured into the conductor slots during a casting operation in the manufacture of the rotor assembly. In order to avoid such a problem, while still retaining design flexibility by enabling the use of a variety of different predetermined configurations for the conductor slots of the main rotor laminae or the vent laminae, according to the invention, a plurality of transition laminae are arranged in the desired manner explained generally, above.

Figure 4:
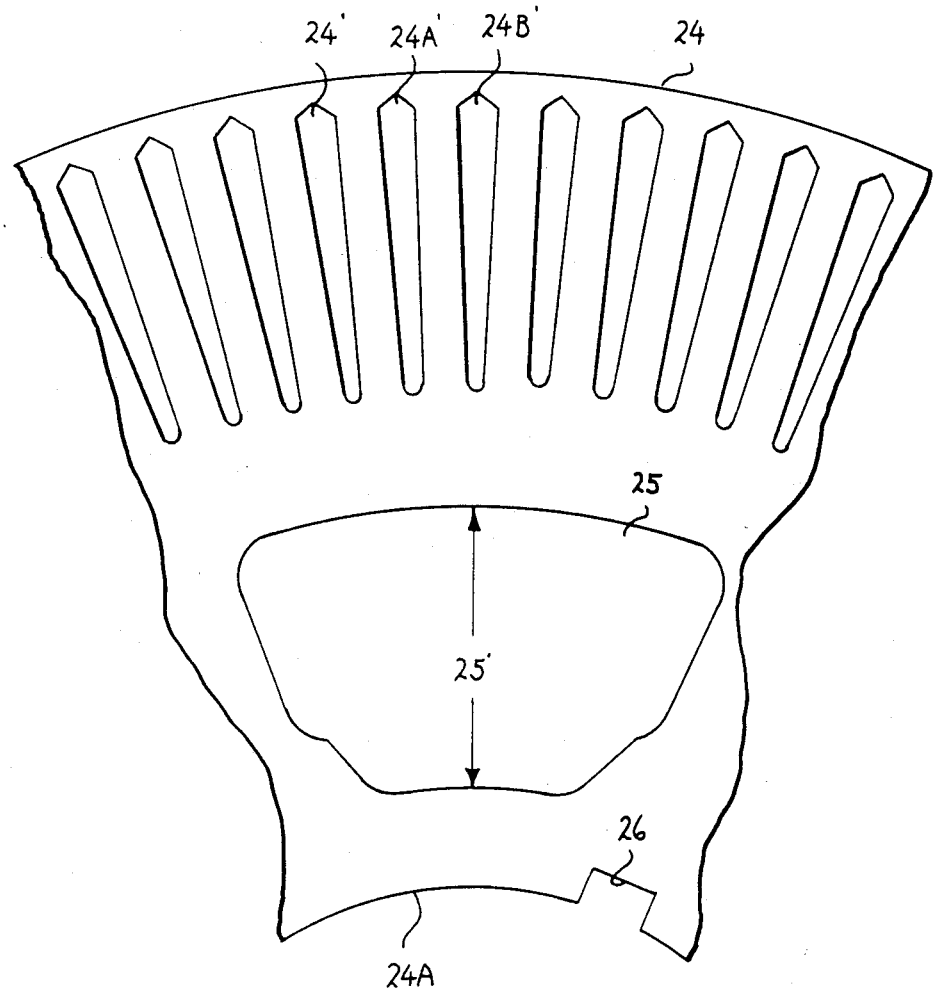
FIG. 4 is a fragmentary, enlarged top plan view of a transition lamina for a dynamoelectric machine rotor such as that shown in FIG. 1.
Figure 5:
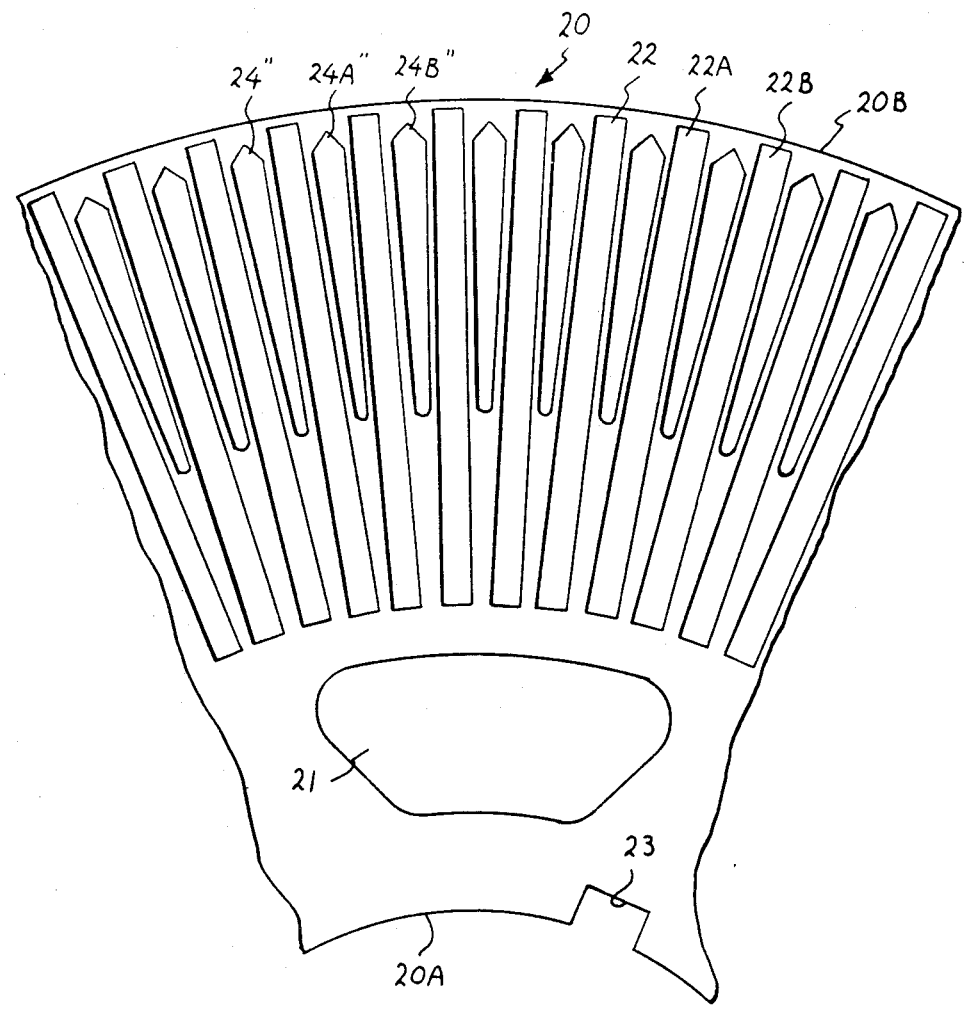
FIG. 5 is a fragmentary, enlarged top plan view of a duct lamina for a laminated rotor such as that shown in FIG. 1.

One of the transition laminae 24 used in the preferred embodiment of the invention is illustrated in FIG. 4. Each of the transition laminae 24 has a plurality of arcuately spaced conductor slots 24', 24A', 24B', etc. punched therein at substantially equally spaced points adjacent its outer circumferential surface. In addition, a plurality of arcuately spaced vent apertures, such as the vent apertures 25 shown in the laminae 24 in FIG. 4, are positioned radially inward from the conductor slots 24', 24A', et cetera. The radial dimension of each of the vent apertures 25 is shown in FIG. 4 by the arrows 25' and is substantially greater in that radial dimension than the radial dimension of the coolant passageways 15 in the main rotor laminae 13 or of the coolant passageways 21 punched through the duct laminae 20, in the preferred embodiment of the invention. Finally, the inner circumferential surface 24A of the transition lamina 24 shown in FIG. 4 is substantially circular in form and opens to a punched keyway 26 that operates in the manner described above to enable each of the transition laminae to be mounted in fixed position on a shaft such as the shaft 7 with a positioning key 7A, as described above in relation to the other laminae used in the rotor 1 shown in FIG. 1.

In the preferred embodiment of the invention, each of the conductor slots 24', 24A', etc. in the transition laminae 24 is substantially identical in configuration to one another and is provided with a selected configuration that is substantially identical to the conductor slot configuration selected for punching the conductor slots 24'', 24A'', etc. in the duct laminae for the preferred embodiment of the invention. It should be understood that in alternative forms of the invention the selected configurations for the conductor slots 24', 24A', etc. used in the transition laminae 24 may differ substantially in configuration from the selected configuration of the conductor slots used in the duct laminae 20. As noted at the outset, this permits greater design flexibility of the conductor slots in the main and vent laminae, while enabling use of standard size conductor slots in the duct laminae. The area of each conductor slot in the transition laminae should not be made too much smaller than the cross-sectional area of juxtaposed conductor slot apertures in the main and vent laminae, in the preferred embodiments. Approximately equal areas can be maintained in these respective conductor slots by either increasing the depth of the relatively narrower conductor slots in the transition laminae, or by otherwise changing the related slot configurations.

In order to provide the desired objectives of the subject invention, it is important that the selected configuration of the conductor slots 24', 24A', etc. for the transition laminae have a certain desired relationship with respect to the coolant ducts 22, 22A, 22B, etc. formed in the coolant duct laminae 20. In particular, this important relationship should be such that the transition laminae are effective to prevent passage of metal from the conductor slots into the coolant ducts during the manufacturing step wherein molten metal is cast into the conductor slots to form cast conductors. To accomplish that desired objective, while at the same time allowing the use of a number of different predetermined conductor slot configurations to be used in making either or both the main rotor laminae 13 and the vent laminae 17, used in the fabrication of a laminated rotor 1 according to the invention, certain limiting relationships are defined below for making the respective conductor slots and coolant ducts in the different groups of laminae used in the manufacture of a laminated rotor, such as the rotor 1 shown in FIG. 1.

Accordingly, it will be understood that such an objective can be afforded by making each of the conductor slots 24', 24A', etc. in the transition laminae 24 narrower at its widest part than the width of the spacing between the coolant duct slots 22, 22A, 22B, etc. in duct laminae 20, stacked adjacent to the transition laminae in an assembled rotor 1. In such an arrangement, the transition laminae cooperate with the adjacent duct laminae to define a plurality of continuous conductor slots between the adjacent groups of laminae and at the same time provide a barrier between those continuous conductor slots and the duct slots in the duct laminae. It will also be understood that by making each conductor slot 24', 24A', etc. in each of the transition laminae 24 substantially the same width at its widest part as the width of the widest part of a conductor slot 24'' in an adjacent duct laminae 20, continuous conductor-receiving slots are formed and the transition laminae serve to prevent molten conductor-forming metal from entering the coolant ducts 22, 22A, etc., because no portion of the duct slots 24', 24A', etc. in the transition laminae is permitted to overlap the ducts 22, 22A, etc. in the duct laminae 20.

In order to more fully explain the importance of the novel features of the transition laminae 24 and their use in constructing a rotor 1 according to the invention, before further elaborating on the variety of optimum relationships between the respective conductor slots of the various groups of laminations in such a rotor, reference is now made again to FIG. 1 and to FIG. 1A of the drawing to more fully describe the features of the preferred embodiment of the rotor 1 illustrated therein. As seen in FIG. 1, the rotor 1 is made up of a plurality of sets A, B, C, D, E and F of stacked laminae and each pair of sets of laminae A–F is stacked with one of the transition lamina positioned between them. In the embodiment of the invention shown, each of these sets of laminae A–F is substantially identical to one another (except for the reverse order of laminae grouping at opposite sides of the stack). It will be understood that, in other embodiments, the relative axial lengths of the various groups of laminations may be varied as desired to achieve given design objectives. As can be seen with reference to FIG. 1A, wherein a complete set of laminae is shown, each set of the sets of laminae used in this embodiment includes a group of main rotor laminae 13' stacked next to a group of vent laminae 17' and a group of duct laminae 20' is stacked adjacent to the group of vent laminae, with at least one transition lamina 24 stacked therebetween. This arrangement defines continuous, axially-extending coolant passageways 12 through the rotor 1. The eight passageways 12 are, respectively, placed in communication with certain of the radial ducts 22, 22A, 22B, etc. (see FIG. 5 as well as FIG. 1) by the vent apertures 18 and 25 (see FIGS. 3 and 4, as well as FIG. 1) in the vent laminae and the transition laminae. In the preferred embodiment of the invention each of the groups of vent laminae (such as the group 17' shown in FIG. 1A) and the groups of duct laminae (such as the group 20' shown in FIG. 1A) are about equal in axial length and are substantially shorter in axial length than each group (such as group 13' shown in FIG. 1A) of main rotor laminae. Accordingly, it should be understood that even though the configuration and cross-sectional area of the conductor slots in the respective groups of duct laminae remain essentially the same, the electrical characteristics of given different rotor assemblies using such standardized duct laminae can be varied appreciably by using different predetermined configurations of conductor slots to define the appreciably greater axial conductor lengths formed by the groups of main rotor laminae 13', etc. and the groups of vent laminae 17', et cetera. As shown in the respective figures of the drawing, in the prefered rotor 1 described herein, the conductor slots 14, 14A, etc. in the main rotor laminae 13 are of a first predetermined configuration that differs substantially from the configuration of the conductor slots 24", 24A", etc. in the duct laminae 20.

In order to avoid the formation of hot spots at different points along the continuous conductors that will be cast in the conductor slots in the assembled laminations, used for this preferred embodiment of the invention, the cross-sectional area of each conductor slot in each transition lamination 24 is made about equal to the cross-sectional area of each of the conductor slots in the main rotor laminations 13. Furthermore, in this embodiment of the invention, the conductor slots in each transition laminae 24 are made substantially identical in configuration to the selected configuration of the conducting slots in the duct laminae 20. This particularly preferred combination of relative conductor slot configurations avoids the formation of undesirable hot spots along the cast conductors (5) when the rotor 1 is placed in operation. However, as noted above, various other combinations of conductor slot configurations may be used in practicing alternative forms of the invention.

Now, considering further some parameters that can be used in establishing critical limits for practicing the invention, it should be understood that in certain predetermined configurations of conductor slots for groups of main rotor laminae 13, such slots can be formed with the widest part of at least one such conductor slot in the endmost main rotor laminae in groups (13', etc.) of main rotor laminae, so it will be wider than the space between adjacent ducts 22, 22A, etc. in an associated group 20' of duct lamina 20 used to form such an alternative rotor. Of course, in such an embodiment of the invention, an intervening transition laminae 24 that is positioned immediately adjacent both sides of the respective groups (20') of duct laminae 20, must have conductor slots (24', 24A') of a selected configuration such that molten metal is blocked by the transition laminae from flowing into the coolant ducts 22, 22A, etc., according to the invention.

In another modification of the invention, even though the width of the conductor slots in the main conductor laminae may be narrower than the spacing between the coolant ducts in associated groups of duct lamina 20, the widest part of the conductor slots 14', 14A', etc. in groups 17 of vent laminae 17 is greater in width than the space between ducts 22, 22A, etc. in associated duct laminae 20. Again, molten metal is prevented from flowing through the wide conductor slots in the vent laminae into the coolant ducts of the duct laminae by the intervening block effect of transition laminae 24 stacked on both sides of the groups of duct laminae, between them and associated groups of vent laminae.

In considering such alternative designs for different forms of rotor assemblies constructed according to the invention, each conductor slot 24', 24A', etc. In the transition laminae 24 can be made about equal in cross-sectional areas to each conductor slot 24", 24A", etc. in the duct laminae 20. Moreover, the configuration of conductor slots in such transition laminae should be shaped to cause those conductor slots to overlap at least part of a conductor slot in an adjacent duct lamina without overlapping any portion of a duct slot (22, 22A, etc.) in the duct laminae 20. In other words, although the preferred embodiment of the invention described herein illustrates the use of identically configured conductor slots in the transition laminae 24 and the duct laminae 20, different conductor slot configurations can be used for those respective types of laminae in other forms of the invention, but it is desirable to keep the cross-sectional area of such differently configured conductor slots about equal in order to avoid hot spots being formed along the cast conductors when a rotor is placed in operation.

Before proceeding to describe the method of the invention, the reader should understand, from the foregoing description of the preferred embodiment and various features and modifications thereof, that a rotor, such as the rotor 1 constructed according to the invention will have the longitudinal axes of the conductor slots in all of the groups of laminae A-F arranged in substantial alignment with one another. And, all of the coolant passageways in the respective stacked laminae will be generally aligned and in overlapping relationship with the vent apertures in the vent laminae and in the transition laminae in order to provide the desired flow of coolant as described generally above. When a stack of laminations is thus arranged to define a rotor assembly, a plurality of cast conductors are positioned respectively in each of the conductor slots by pouring molten metal into the slots (and into associated molds for forming rings 6 and 6A) to define such conductors and the rings 6 and 6A shown in FIG. 1. Also, it should be understood that rotors made according to the invention will have the bridge area over the outer ends of the conductor slots machined off to expose the conductors in the slots, before the rotor is placed in operation.

Figure 6:
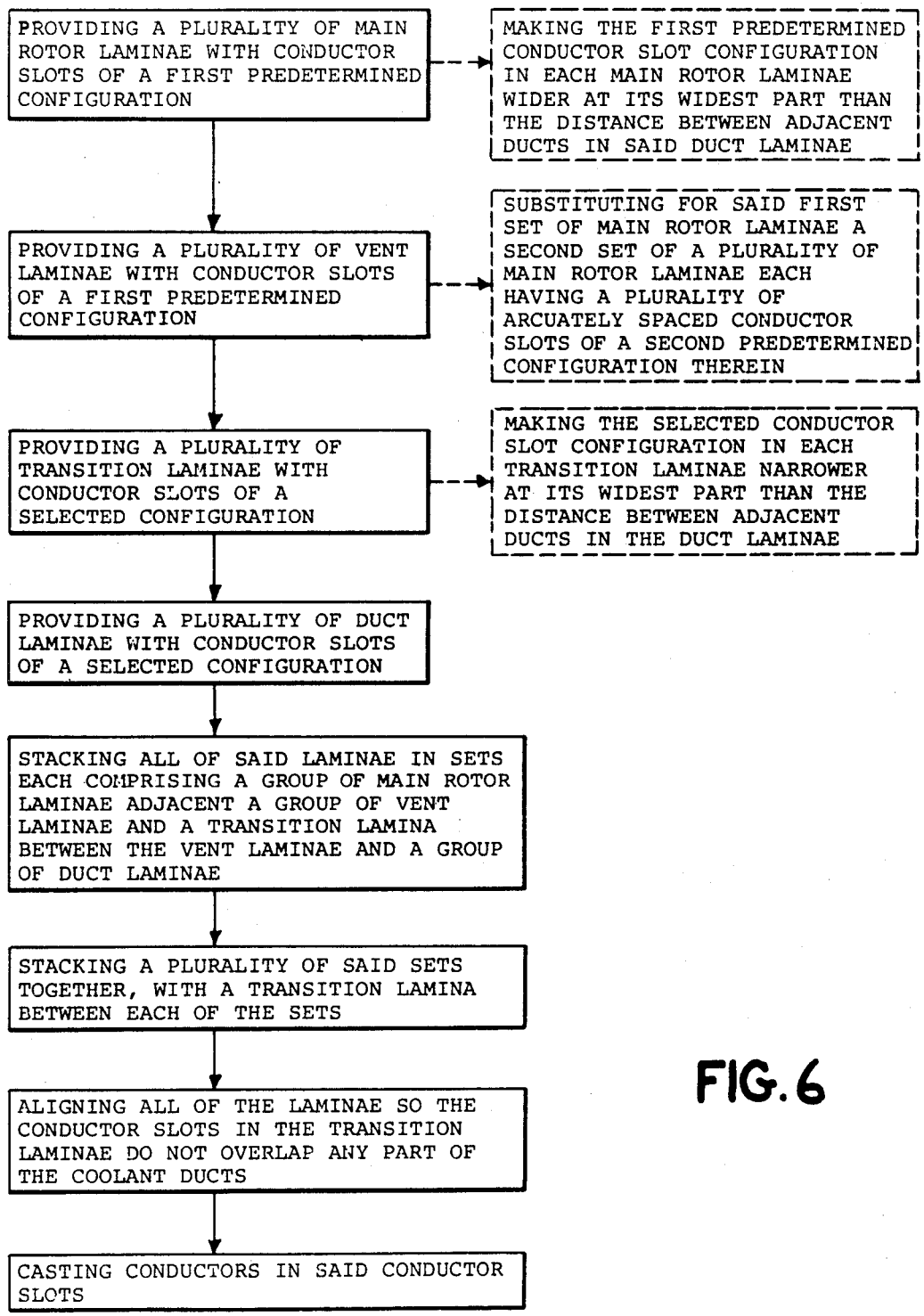
FIG. 6 is a flow chart illustrating arrangements of method steps of the invention.

Turning now to a description of the method of the invention, reference may be made to FIG. 6 of the drawing. In the preferred arrangement of the method of the invention a laminated rotor having cast conductor bars, axially extending coolant passageways and radial coolant ducts is made by practicing the following steps as generally outlined in FIG. 6. The practitioner begins by providing a first set of a plurality of main rotor laminae (such as the main rotor laminae 13 discussed above with reference to FIG. 2), each of which has a plurality of arcuately spaced conductor slots of a first predetermined configuration formed therein and further includes a plurality of arcuately spaced coolant passageways that are positioned radially inward from the conductor slots, in the manner generally described above with reference to the construction of the rotor 1 shown in FIG. 1. Next, the practitioner continues to practice the method by providing a plurality of vent laminae (such as the vent laminae 17 discussed above with reference to FIG. 3), each of which has a plurality of arcuately spaced conductor slots of a first predetermined configuration and further is provided with a plurality of arcuately spaced vent apertures positioned radially inward from the conductor slots. Then subsequently providing a plurality of transition laminae (such as the transition laminae 24 discussed above with reference to FIG. 4), each of which has a plurality of arcuately spaced conductor slots of a selected configuration, and a plurality of arcuately spaced coolant passageways positioned radially inward from the conductor slots and also a plurality of radial coolant ducts that are disposed respectively between a pair of the conductor slots.

After suitable numbers of each of the foregoing laminae have been provided, all of the laminae are stacked to form sets of laminae, each of which comprise a group of main rotor laminae stacked next to a group of vent laminae, and at least one transition lamina stacked between the group of vent laminae and a group of duct laminae. Practice of the method continues by stacking the plurality of sets of laminae on one another with a transition lamina stacked between each of the sets. Then, all of the stacked sets of laminae and all of the transition laminae between the sets are aligned so that each conductor slot in the respective laminae is in general alignment with conductor slots in the next adjacent laminae within the stack, in a manner such that the conductor slots in each of the transition laminae do not overlap any part of the coolant ducts in adjacent duct laminae. The final step of the preferred arrangement of the method is performed by casting conductors in the respective conductor slots defined by the aligned sets of laminae, thereby to form continuous conductors extending axially the full length of the stacked sets of laminae.

By practicing the method of the invention according to the basic steps just explained, one can achieve the advantageous objectives stated at the outset; namely, preventing the introduction of molten metal into the coolant ducts from the conductor slots, while at the same time accommodating the use of various different predetermined conductor slot configurations for at least some of the main rotor laminations and/or for the vent laminations. In modifications of the basic method steps, one practicing the invention can elect to make the first predetermined conductor slot configuration in each of the main rotor laminae wider at its widest part than the distance between adjacent ducts in the duct laminae, and also make the selected conductor slot configuration for each of the transition laminae narrower at its widest part than the distance between adjacent ducts in its duct laminae. By thus controlling the relative dimensions of the respective conductor slots in the main rotor laminae and the transition laminae, the transition laminae are made to function to block molten metal from the cooling ducts when conductors are cast into the aligned conductor slots.

It should be noted in practicing such alternative method steps that while the predetermined configuration of the conductor slots in the main rotor laminae may be varied with respect to the selected configuration for the conductor slots in adjacent transition laminae, it is generally preferable to make the cross-sectional area of the predetermined conductor slot configurations of the main rotor laminae about equal to the cross-sectional area of the selected conductor slot configuration in the transition laminae, in order to prevent the development of hot spots in the conductors when the rotor is placed in operation.

As pointed out earlier, one of the major advantages of the method of the invention is that it enables the practitioner to utilize different groups of either main rotor laminae or vent laminae in combination with standardized groups of duct laminae. Accordingly, it is not necessary to punch different size ducts in the duct laminae to accommodate variations in the size or shape of conductor slots used in the main rotor laminae. Thus, in practicing a further modification of the basic method steps of the invention the practitioner can substitute for the first set of main rotor laminae described in explaining the initial steps of the invention, as set forth in the first column of FIG. 6, a second set of a plurality of main rotor laminae each of which has a plurality of arcuately spaced conductor slots of a second predetermined configuration formed in them. Of course, a plurality of arcuately spaced coolant passageways is also positioned radially inward from the conductor slots. In such a second set of main rotor laminae one can make the second predetermined conductor slot configuration in the transition laminae. Also, one can continue modifying the method of the invention by making the second predetermined conductor slot configuration in the main rotor laminae overlap the radial ducts in the duct laminae in a manner such that molten metal would (in the absence of transition exposure) flow from the conductor slot in the main rotor laminae into the coolant ducts of the duct laminae when conductors are cast in the stacked sets of laminae. However, the blocking effect of the transition laminae stacked on the opposite ends of each group of duct laminae, as explained in the basic method steps of the invention, serves to prevent such an undesirable flow of metal from the conductor slots into the coolant ducts of a rotor manufactured according to the modification of the method of the invention.

From the foregoing description of the invention, the operation of it will be apparent to those skilled in the art and it will be recognized that in addition to the modifications and alternative forms of the invention described above, further changes may be made in the basic structure and fundamental method steps explained without departing from the true spirit of the invention. Accordingly, it is my intention to encompass within the following claims the true spirit and scope of the invention.

What I claim as new and desire to secure by Letters Patent of the United States is:

1. A method of manufacturing a laminated rotor having cast conductor bars, axially extending coolant passageways and radial coolant ducts comprising the steps of:

(a) providing a first set of a plurality of main rotor laminae each having a plurality of arcuately spaced conductor slots of a first predetermined configuration therein and a plurality of arcuately spaced coolant passageways positioned radially inward from the conductor slots, (b) providing a plurality of vent laminae each having a plurality of arcuately spaced conductor slots of a first predetermined configuration, and a plurality of arcuately spaced vent apertures positioned radially inward from the conductor slots, (c) providing a plurality of transition laminae each having a plurality of arcuately spaced conductor slots of a selected configuration, and a plurality of arcuately spaced vent apertures positioned radially inward from the conductor slots, (d) providing a plurality of duct laminae each having a plurality of arcuately spaced conductor slots of a selected configuration, a plurality of arcuately spaced coolant passageways positioned radially inward from the conductor slots, and a plurality of radial ducts, each of said ducts being positioned between a pair of said conductor slots, (e) stacking all of said laminae to form sets of laminae, each set comprising a group of main rotor laminae stacked next to a group of vent laminae and at least one transition lamina stacked between said group of vent laminae and a group of duct laminae, and (e-1) stacking a plurality of said sets on one another, with a transition lamina stacked between each of said sets, (e-2) aligning all of the stacked sets of laminae, and all of the transition laminae between said sets, so each conductor slot therein is in general alignment with conductor slots in the next adjacent laminae in the stack, and so the conductor slots in said transition laminae do not overlap any part of the ducts in adjacent duct laminae, and (f) casting conductors in said conductor slots to form continuous conductors extending axially the full length of said stacked sets of laminae, (g) making said first predetermined conductor slot configuration in the main rotor laminae wider at its widest part than the distance between adjacent ducts in said duct laminae, and (h) making said selected conductor slot configuration in said transition laminae narrower at its widest part than the distance between adjacent ducts in said duct laminae, whereby the transition laminae block casting metal from the ducts when conductors are cast in the conductor slots.

2. The method defined in claim 1 including the step of:

(a-1-1) making said first predetermined conductor slot configuration in the main rotor laminae about equal in cross-sectional area to the cross-sectional area of the selected conductor slot configuration of the conductor slots in said transition laminae.

3. The method defined in claim 1 including the step of:

(a-2) substituting for said first set of main rotor laminae a second set of a plurality of main rotor laminae each having a plurality of arcuately spaced conductor slots of a second predetermined configuration formed therein, and a plurality of arcuately spaced coolant passages positioned radially inward from the conductor slots.

4. The method defined in claim 3 including the step of:

(a-3) making said second predetermined conductor slot configuration in the main rotor laminae substantially different in form than the selected conductor slot configuration in said transition laminae, and making said second predetermined conductor slot configuration in the main rotor laminae overlap the radial ducts in said duct laminae whereby molten metal would flow from the conductor slots in the main rotor laminae into the coolant ducts of the duct laminae when conductors are cast in the stacked sets of laminae but for the blocking effect of the transition laminae stacked on the opposite ends of each group of duct laminae.

* * * * *